UNITED STATES PATENT OFFICE.

ROBERT F. NENNINGER, OF NEWARK, NEW JERSEY, ASSIGNOR TO EDWARD J. ILL, OF SAME PLACE.

METHOD OF PRODUCING ZINC OXIDE FROM SULPHITE OR SULPHATE OF ZINC.

SPECIFICATION forming part of Letters Patent No. 489,873, dated January 10, 1893.

Application filed September 21, 1892. Serial No. 446,726. (No specimens.)

*To all whom it may concern:*

Be it known that I, ROBERT F. NENNINGER, a citizen of the United States, and a resident of Newark, in the county of Essex and State of New Jersey, have invented certain new and useful Improvements in Methods of Producing Zinc Oxide from Sulphite or Sulphate of Zinc, of which the following is a specification.

The object of my invention is to recover zinc oxide from a solution of sulphate or sulphite of zinc, or a mixture of the same, such as is obtained by the condensation in water of fumes and sulphurous acid passing off with the gases in smelting zinc ores containing sulphur, or by leaching roasted ores.

In carrying out my invention I treat the solution of sulphate or sulphite of zinc, or a mixture of the same, with lime or with lime water, or its equivalent such as baryta or strontia, whereby I obtain a precipitate consisting of a mixture of zinc hydrate and sulphate of lime. This precipitate I separate from the liquid by filtration or pressing, and then boil it with a concentrated solution of zinc sulphate so as to form a basic zinc salt which is soluble in water. I then filter so as to separate the insoluble sulphate of lime from the basic zinc sulphate, evaporate the liquid to dryness and leach with water, which dissolves neutral zinc sulphate and leaves undissolved zinc oxide, which is collected.

The zinc sulphate solution, after concentration, I use over again in the same manner for treating new quantities of the mixture of zinc hydrate and sulphate.

What I claim as my invention and desire to secure by Letters Patent is:—

The method of recovering oxide of zinc from a solution of sulphate or sulphite of zinc, which consists in precipitating with lime, collecting the precipitate and boiling it with a concentrated solution of zinc sulphate, filtering, evaporating the filtrate to dryness and finally leaching with water, substantially as specified.

In testimony that I claim the foregoing as my invention I have signed my name, in presence of two witnesses, this 7th day of July, 1892.

ROBERT F. NENNINGER.

Witnesses:
KLAS H. TERNSTEDT,
J. J. MALLE.